United States Patent
Matter et al.

(10) Patent No.: US 7,222,028 B2
(45) Date of Patent: May 22, 2007

(54) INCREASED ACCURACY GAS ENERGY METER

(75) Inventors: Daniel Matter, Brugg (CH); Bruno Sabbattini, Zürich (CH); Thomas Kleiner, Fislisbach (CH); Philippe Pretre, Baden-Dattwil (CH)

(73) Assignee: EMS-Patent AG, Domat/EMS (CH)

( * ) Notice: Subject to any disclaimer, the term of this patent is extended or adjusted under 35 U.S.C. 154(b) by 0 days.

(21) Appl. No.: 10/543,230

(22) PCT Filed: Jan. 23, 2003

(86) PCT No.: PCT/CH03/00055

§ 371 (c)(1),
(2), (4) Date: Jan. 10, 2006

(87) PCT Pub. No.: WO2004/065915

PCT Pub. Date: Aug. 5, 2004

(65) Prior Publication Data

US 2006/0212249 A1    Sep. 21, 2006

(51) Int. Cl.
*G01F 1/00* (2006.01)
(52) U.S. Cl. ........................................... 702/45
(58) Field of Classification Search ............... 702/45; 324/74

See application file for complete search history.

(56) References Cited

U.S. PATENT DOCUMENTS 5,311,447 A    5/1994  Bonne
5,623,833 A *  4/1997  Mitchell et al. .............. 62/85
5,741,978 A *  4/1998  Gudmundsson .......... 73/861.04
6,244,097 B1   6/2001  Schiley et al.
6,272,919 B1   8/2001  Huiberts
6,476,592 B1 * 11/2002  Humlum ...................... 324/74

FOREIGN PATENT DOCUMENTS

| EP | 0 373 965 | 1/1989 |
| EP | 0 468 872 | 1/1992 |
| EP | 1 227 305 | 1/2001 |
| EP | 1 164 361 | 12/2001 |
| WO | 01/18500 | 3/2001 |
| WO | 01/96819 | 12/2001 |

* cited by examiner

*Primary Examiner*—John Barlow
*Assistant Examiner*—Xiuqin Sun
(74) *Attorney, Agent, or Firm*—Fay Kaplun & Marcin, LLP

(57) ABSTRACT

Described is a method and a device for more accurate measurement of a gas supply with a gas meter. A consumption-weighted correction factor is determined by weight averaging of a sensor error factor of the gas meter with a consumption profile characteristic of the gas supply location and the measuring signal is converted using the correction factor. Embodiments relate inter alia to: operation of the gas meter as volume, mass or energy meter; formulae for determining the correction factor with sensor error factors and consumption profiles relative to volume, mass or energy; and measuring signal correction in the case of a non-registering or registering gas meter. Advantages are inter alia: subsequent customer-specific measuring signal correction; no additional measuring complexity; and improved measuring accuracy, in particular improved energy measurement by means of compensation for inherent deviations of the energy signal in the vase of heat value variations.

29 Claims, 2 Drawing Sheets

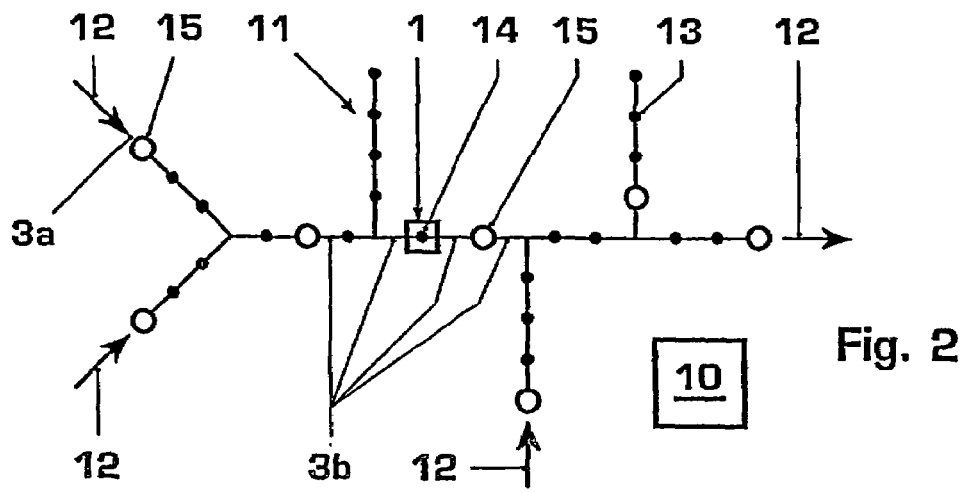
Fig. 2
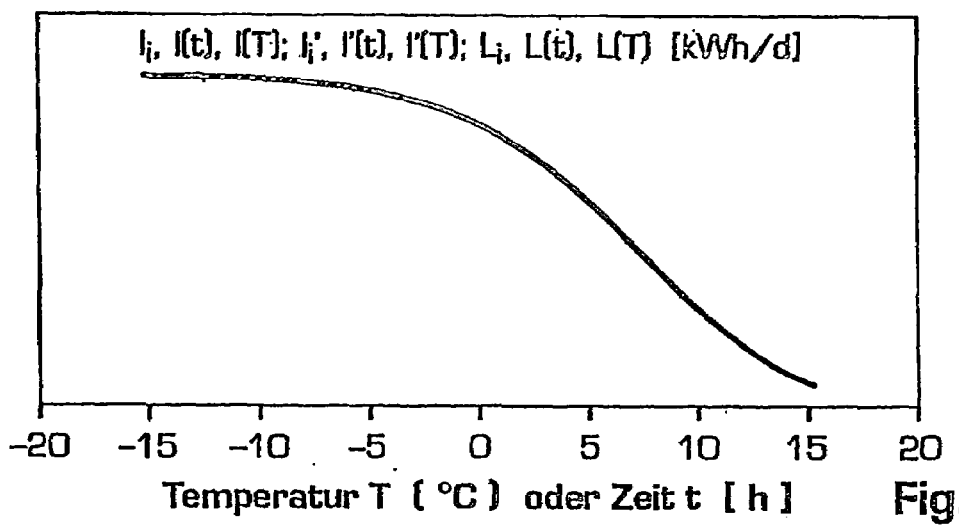
Temperatur T [°C] oder Zeit t [h]    Fig. 3
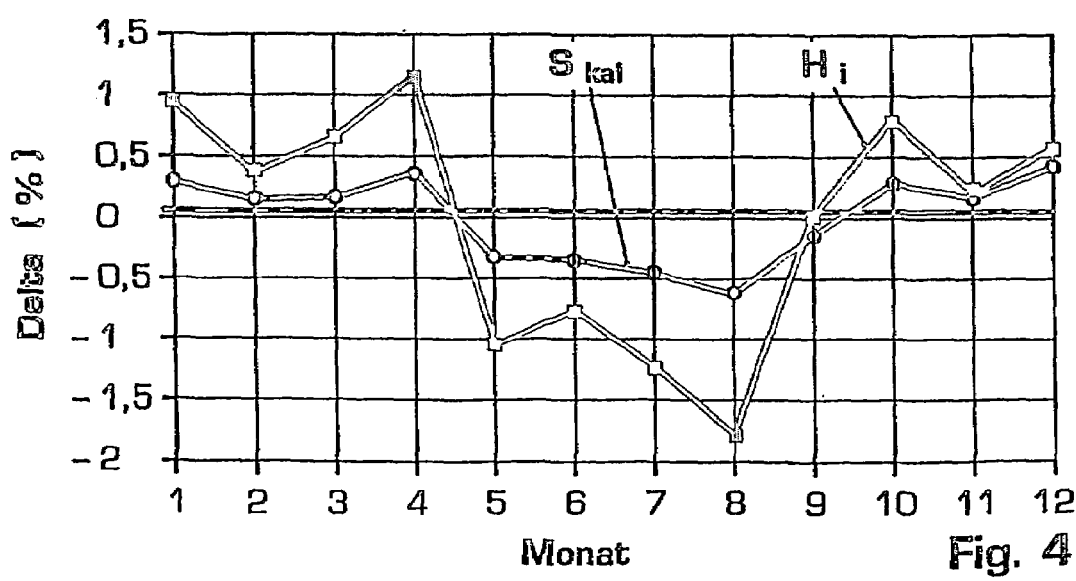
Monat    Fig. 4

INCREASED ACCURACY GAS ENERGY METER

TECHNICAL FIELD

The present invention relates to the field of gas supply measurement with through-flow sensors and in particular thermal through-flow sensors.

BACKGROUND INFORMATION

A gas meter which is calibrated as an energy measuring device is disclosed in WO 01/96819 A1. The calibration is based on the fact that sensor signal values are determined dependent upon the through-flow rate of a calibration gas and are stored in the gas meter in the form of a sensor calibration curve. The sensor calibration curve or the sensor signal values are multiplied by a signal conversion factor and a calorific value factor for the basic gas mixture so that the obtained product indicates gas consumption in an energy unit. With a further correction factor, the actual heat value of a supplied gas mixture can be taken into account at least approximately in the energy calibration. As actual heat value, a measured heat value which is averaged over a specific time span can be used. It is disadvantageous that an external unit is required to determine the heat value.

EP 1 227 305, a method and a gas meter for determining a gas consumption from a corrected mass flow signal or energy supply signal are disclosed. On the static gas, diffusivity and therefrom a gas-specific correction value f* for the mass flow or energy supply is determined thereby from a measured heating time.

In EP 0 373 965, a method and a device for determining a gas or energy consumption from a corrected mass flow signal are disclosed. During the signal correction, the heat conductivity, specific heat capacity and density of the gas are taken into account. The corrected mass flow signal and hence gas or energy consumption signal is independent of the type of gas and in particular is identical for air, argon, helium, carbon dioxide, methane and propane. It is disadvantageous that a mass flow signal standardised in such a way is not sensitive to the heat value of a gas or gas mixture since combustible gases with different heat values (e.g. methane or propane) produce the same mass flow signals and even the same signals as non-combustible gases (e.g. helium, argon, carbon dioxide or air).

In the U.S. Pat. No. 5,311,447, a method and a device for combustion-less determination of the specific heat value of natural gas are disclosed. For this purpose, specific heat value, density or proportion of inert gases are determined by empirical formulae from measured values of viscosity, heat conductivity, heat capacity, optical absorption, etc. The large measuring and computing complexity is disadvantageous in quantitative measurement of a plurality of independent gas type-dependent values and, in the case of combination thereof, with a volume flow measurement in a gas meter in order to determine a consumed quantity of energy.

In WO 01/18500, an improved mass flow measurement with two thermal CMOS anemometers is disclosed. On the static gas, measurements are made of heat conductivity in the case of a constant heat output and, in the case of a pulsed heat output, of heat capacity, the gas is identified and, from the specific heat value thereof together with the mass flow measurement, the total calorific value of the gas is determined. The relatively large complexity when determining the consumed quantity of energy from separate values of mass flow and specific heat value is in turn disadvantageous.

In addition, the specific heat value for a sufficiently accurate determination of the energy supply must be measured continuously and with great accuracy.

In the article by D. Hoburg and P. Ulbig, "Statutory Metering and Calorific Value Reconstruction Systems", Gas ● natural gas 143 (2002) No. 1, calorific value reconstruction systems for gas networks with different supply calorific values are disclosed. By simulation of the natural gas flows in the mains system, with the assistance of measuring data such as temperature and pressure, the gas constitution at any points in the gas network can be calculated. In particular the delivery calorific value at the delivery point to the customer can be calculated dynamically from the supply calorific values, supply through-flows, delivery through-flows and further auxiliary values such as network pressures. Normal gas constitution data, which must be detected by measurement technology at the supply points, are calorific value, standard density, $CO_2$ content and $H_2$ content. It is also disadvantageous that the geometry and topology of the network, in particular pipe roughnesses, are mostly inadequately known and the simulation calculation becomes altogether inaccurate. Also the result of the simulation calculation depends greatly upon the chosen pipe flow model and upon the computer power which is available.

SUMMARY OF INVENTION the present invention relates to a method and a device for determining a gas energy supply with improved accuracy.

The invention resides in a first aspect in a method for measuring a gas supply, in particular in the private, public or industrial sector, by means of a gas meter which is disposed at a gas supply location of a gas supply network, a measuring signal $V_s$, $V_{ns}$, $M_s$, $E_s$ for a quantity consumption and/or energy consumption of the gas being determined by the gas meter by means of a through-flow sensor, a sensor error factor $f_i$ (or $f_i'$, $f_i''$, $f_i'''$) of the gas meter being known in order to detect deviations between the consumption measured by the gas meter and the actual consumption, a consumption profile $l_i$ (also $l_i'$, $L_i$) for the gas consumption, which profile is characteristic of the gas supply location, being known, the sensor error factor $f_i$ and the consumption profile $l_i$ for an accounting period being definable as a function of a common variable t or T and a consumption-weighted correction factor F relative to the accounting period being determined by averaging the sensor error factor $f_i$ weighted with the consumption profile $l_i$ and, with the correction factor F, the measuring signal $V_s$, $V_{ns}$, $M_s$, $E_s$ being converted into an output value $V_n$, M, E. The conversion can be implemented in the gas meter or outwith it, e.g. at the gas network operator. The sensor error factor $f_i$ takes into account inherent, typically gas type-dependent measuring errors of the gas meter or through-flow sensor. The consumption profile $l_i$ is intended to reproduce the consumption behaviour of the gas energy subscriber as realistically as possible. It can be given for through-flow rates in any units, e.g. volume flow, mass flow or gas energy flow. The correction factor F is normally calculated by multiplication or in a similarly operating manner by the measuring signals. The method and gas meter according to the invention has the substantial advantage that variations in the gas composition are weighted with the customer-specific consumption behaviour and are used only in such a customer-specific form for correction of the measuring signal $V_s$, $V_{ns}$, $M_s$, $E_s$. As a result, the accuracy of a gas volume, gas mass or gas energy measurement is significantly increased.

In one embodiment, the measuring signal is an operating volume signal $V_s$, standard volume signal $V_{ns}$, gas mass signal $M_s$ or energy signal $E_s$ measured by the gas meter and/or the output value is a supplied standard volume $V_n$, a supplied gas mass M or a supplied gas energy E.

In another embodiment, the averaging comprises summation and/or integration over the common variable of products which contain the sensor error factor and the consumption profile, and/or the averaging is implemented taking into account a heat value profile $H_i$ (or $H_i'$) relative to the common variable. In particular, the averaging includes a suitable standardisation function.

The embodiment according to claim 4a has the advantage that a measuring signal can be added up in the gas meter over for example half a year or an entire year, read by the gas man or transmitted and corrected only subsequently with respect to variations in gas composition and in particular in heat value. The correction factor F can be determined by an independently implemented averaging, in particular a priori, simultaneously or a posteriori for measuring signal detection. Hence, in the case of non-registering gas meters, the time-averaged measuring signal can be corrected in a customer-specific manner with little complexity without heat value variations and/or gas load profiles requiring to be detected locally or transmitted to the gas supply location. The subsequent measuring signal correction can be implemented in principle also in the gas meter itself.

The embodiment according to claim 4b has the advantage that a measuring signal can be detected during registering operation and converted or corrected immediately or with a slight time delay with a currently determined correction factor F. In the current correction factor F, for example measured or predicted values of the sensor error factor $f_i$, of the consumption profile $l_i$ and if necessary of the heat value $H_i$ can be taken into account. As a result, a registering gas meter can be produced with the highest measuring accuracy. The current measuring signal correction can be implemented in the gas meter or outwith the gas meter.

The embodiment according to claim 5 has the advantage that, in the case of a known gas composition, the sensor error factor $f_i$ and, if required, the heat value $H_i$ can be determined immediately.

The embodiment according to claim 6 has the advantage that the gas composition is already known to the operator or can be determined easily by the operator and/or can be calculated by means of known simulation models for gas flows in the network.

The embodiment according to claim 7 has the advantage that the sensor error factor $f_i$, the consumption profile $l_i$ and if necessary the heat value $H_i$ can be represented as a function of time or temperature and averaged together.

The embodiments according to claim 8 and 9 have the advantage that the local gas subscriber can choose that gas consumption or load profile $l_i$ which can be determined easily and can be updated simply if necessary, which demands little computing complexity and in particular memory requirement and/or which has the greatest prediction force for the gas consumption to be expected.

The embodiments according to claim 10–12 relate to concrete computer specifications for exact calculation of the correction factor F when using the gas meter as volume, gas mass or gas energy measuring device.

The embodiments according to claim 13–15 relate to calibration of the gas meter as energy measuring device, in particular an inherent dependency of the thermal through-flow sensor signal upon the heat value $H_i$ being able to be taken into account in order to improve the accuracy of the gas energy measurement.

The invention resides in a second aspect in a gas meter for measuring a gas supply, in particular in the private, public or industrial sector, the gas meter being disposed at a gas supply location of a gas supply network and having a through-flow sensor and a measuring and evaluating unit for determining a measuring signal $V_s, V_{ns}, M_s, E_s$ for a quantity and/or energy consumption of the gas, furthermore computing means for determining and/or storing a typically gas type-dependent sensor error factor $f_i$ (also $f_i', f_i'', f_i'''$) of the gas meter and a consumption profile $l_i$ (also $l_i', L_i$) which is characteristic of the gas supply location and also for calculating a correction factor F by weighted averaging of the sensor error factor $f_i$ with the consumption profile $l_i$ being present and furthermore computing means for converting the measuring signal $V_s, V_{ns}, M_s, E_s$ by means of the correction factor F into an output value $V_n$, M, E of the gas meter being present. Preferably, a data memory for storing the sensor error factor $f_i$ and the consumption profile $l_i$ as a function of a common time variable and/or temperature variable are present and/or the computing means and/or the data memory are disposed outwith the gas meter or in the gas meter.

The embodiments according to claims 18–20 enable a particularly simple construction and operation of the gas meter as energy measuring device.

Further embodiments, advantages and applications of the invention are revealed in the dependent claims and also in the description and Figures which now follow.

BRIEF DESCRIPTION OF DRAWINGS

FIG. 2 shows a gas distribution network;

FIG. 3 shows a load profile of a gas consumer at a gas supply location; and

FIG. 4 shows measurement curves for natural gas for demonstrating a partially correlated behavior of monthly average values of sensor signals of the thermal gas meter with heat values of natural gas.

DETAILED DESCRIPTION

Figure 1:
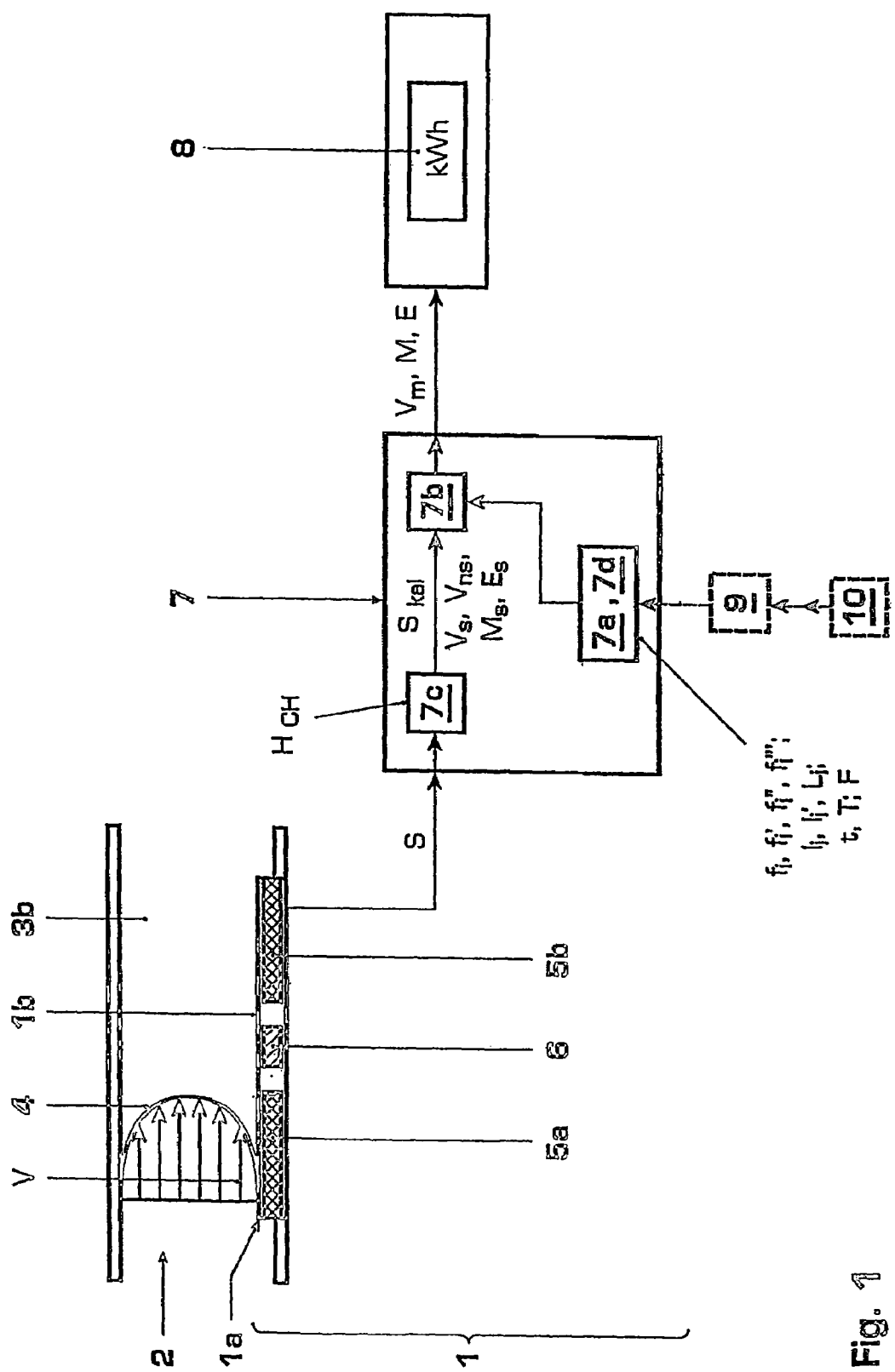
FIG. 1 shows, in cross section, a pipe with a through-flow, having a thermal gas meter with means for improved measuring signal correction according to an exemplary embodiment of the present invention.

FIG. 1 shows a gas meter 1 comprising a thermal through-flow or mass flow sensor 1a which comprises a sensor element 1a, which is disposed in a flow channel or pipe 2, and a measuring and evaluating unit 7. In the pipe 2 flows a gas 3b with a flow and velocity profile 4. The sensor element 1a is subjected to a flow velocity v to be measured. The through-flow sensor 1a comprises a heating element 6, a first temperature sensor 5a upstream and a second temperature sensor 5b downstream. From temperature signals $T_1, T_2$ of the temperature sensors 5a, 5b, a mass flow or standard volume flow signal S can be determined in a known manner. The principal mode of operation is based on the fact that a temperature distribution through the flow 4, produced by the heating element 6, becomes asymmetric and a temperature difference $T_1-T_2$ at the temperature sensors 5a, 5b is used as a measure of the flow velocity v or the mass flow dm/dT. The mass flow signal S is to a good approximation proportional to the temperature difference $T_1-T_2$. In addition in the present case, energy signals $E_s$ are determined and output, by means of a first basic heat value factor $H_{CH}$ relative to a basic gas mixture, by the measuring means 7 from the mass flow signal S or in general sensor signal S of the through-flow sensor 1a. In this way, a calibration of the gas meter 1 as energy measuring device is achieved. The calibration as energy measuring device is disclosed in WO 01/96819 A1, the content of which is herewith introduced in the present disclosure in its entirety by reference. Likewise, the three articles cited therein relating to the CMOS anemometer by J. Robadey and F. Mayer et al. may be introduced here by reference. The CMOS anemometer described there is particularly suitable as sensor element 1a of the through-flow sensor.

According to the invention, a typically gas type-dependent sensor error factor $f_i$, $f_i'$, $f_i''$, $f_i'''$ and a customer-specific consumption profile $l_i$, $l_i'$, $L_i$ is determined or detected by the gas meter 1, a correction factor F is calculated therefrom and, with this, a measuring signal $V_s$, $V_{ns}$, $M_s$, $E_s$ of the gas meter 1, in particular an energy signal $E_s$, is converted into an output value $V_n$, M, E, in particular a gas energy E, with improved calibration accuracy. The method is represented in detail in the course of the description and in various embodiments.

Instead of the through-flow sensor 1a with two temperature sensors 5a, 5b and in particular instead of the CMOS anemometer 1a, also a thermal through-flow sensor can be used in general for the operability of the gas meter 1 as volume, mass or energy meter 1, in which through-flow sensor the gas 3b is guided via a sensor element which has a heating means for temperature change and a sensor means for determining its temperature, the flow-dependent temperature change in turn being a measure of the through-flow or mass flow. Alternatively, the thermal through-flow sensor 1a can also be operated with only one temperature sensor 5a which is disposed upstream. The method according to the invention can also be implemented with any non-thermal gas meter 1 which, upon a through-flow, e.g. a mass flow, delivers calibrated signals. In general, the mass flow dm/dt can be indicated in mass or, in the case of a constant gas type, in standard volume units, e.g. in kg/min or can be determined according to $dm/dt = \rho \cdot dV/dT$ by means of the density ρ from a volume flow dV/dT.

FIG. 2 shows a diagram of a gas supply network 11 with gas supply locations 12, consumers 13 and measuring points 15, in particular for through-flow measurement and if necessary pressure or temperature measurement. The distribution network 11 is controlled and monitored by a central office or by an operator 10. The gas supply location, at which a gas meter 1 according to the invention is installed, is designated for example with 14. A supplied gas composition 3a or a gas composition 3b present at the gas supply location 14 can be determined by an operator 10 of the gas supply network 11, for example from empirical values, measuring values, prognosis values or values of the gas quality derived therefrom. The gas composition 3b at the gas supply location 14 can also be calculated at least approximately from the supplied gas quality by means of simulation calculation for gas flows in the gas supply network 11. Methods for this purpose can be deduced for example from the initially mentioned article by D. Hoburg and P. Ulbig, which is introduced herewith in its entirety by reference.

Preferably, the gas meter 1 is operated in the conventional manner in a non-registering manner, is read now and again and subsequently the integral measuring signal $V_s$, $V_{ns}$, $M_s$, $E_s$ is converted into the more precise output value $V_n$, M, E. The conversion can be implemented subsequently in the gas meter 1 or preferably outwith it, for example at the network operator 10.

The method can also be applied to a registering gas meter 1. For this purpose, a gas meter 1 comprises a receiving unit 9 for receiving heat value data of a gas composition 3b present at the gas supply location 14 from an external unit 10, in particular an operator 10 of the entire gas network 11 or of a partial network. The operator 10 can ascertain measuring data by himself or through external locations and use analysis means to determine the gas composition 3a. He can deliver to the local gas meter 1 raw data or prepared data, in particular a specific heat value profile $H_i$, $H_i'$, for the local gas composition 3b or the one present in the relevant sub-network. Calculation and data transmission to the gas meter 1 can be repeated at prescribable time intervals. The reliability of the energy measurement is significantly increased since, using global and local data, an improved heat value correction can be implemented. The global data relate to the gas supply and gas distribution in the network. They are present at the operator 10 and can be used in a manner known per se to determine a local gas composition 3b relating to the gas supply location 14. Data relating to the local gas consumption behaviour $l_i$, $l_i'$, $L_i$ of the customer, which can be detected by the gas meter 1, can be collected directly in situ or be determined in another manner. By combining these data, the gas energy supply E from the energy measuring device 1 is determined with significantly improved accuracy. This combination of the data and the conversion of the measuring signal $V_s$, $V_{ns}$, $M_s$, $E_s$ to the more precise output value $V_n$, M, E can be implemented in the gas meter 1 or outwith the gas meter 1, for example at the network operator 10. Deviating from the representation in FIG. 1, 9 then serves as transmission unit for transmitting the measuring signals $V_s$, $V_{ns}$, $M_s$, $E_s$ to the central office 10, where the computing units 7a, 7b and/or the data memory 7d are preferably present.

FIG. 3 shows a load profile of the gas consumer at the supply location 14. The consumption profile $l_i$, $l_i'$, $L_i$ can be a gas quantity load profile l (T) relative to a standard volume $V_n$, a gas mass load profile $l_i'$ (T) relative to a gas mass M or a gas energy load profile $L_i$ (T) relative to a gas energy E. By way of example, a gas consumption profile l (t) is plotted e.g. in energy units per day (kWh/d) against a temperature T in ° C. The gas consumption characteristic can be approximated for example by a function $l(T) = (A + e^{B \cdot T + C})^{-1} + D$, wherein A, B, C and D are determinable, consumer-specific parameters. Other functions or approximation formulae l (T) for approximation or prediction of the gas supply behaviour are also possible, similarly the tabular storage of support point values $l_i$ with discreet temperature values $T_i$ with i=integer index. The consumption profile $l_i$, $l_i'$, $L_i$ can be determined globally for a section of the gas supply network 11 comprising the gas supply location 14 or locally for the gas supply location 14. The functional correlation l (T) or support point values $l_i$ ($T_i$) can be obtained from empirical values, measuring values, prognosis values or values derived therefrom for a gas consumption to be expected at the gas supply location 14. The temperature variable T can describe an outside temperature or a temperature average value at the gas supply location 14. Alternatively, the load profile $l_i$, $l_i'$, $L_i$ can be defined for a time variable, in particular dependent upon time of day, weekday, month or course of a year.

The sensor error factor $f_i$, $f_i'$, $f_i''$, $f_i'''$ and in particular a heat value or heat value profile $H_i$, $H_i'$ can be determined from the gas composition 3a, 3b, for example by means of calibration tables. Advantageously, the gas composition 3a, 3b and the consumption profile $l_i$, $l_i'$, $L_i$ are known as a function of the common variables t, T. The sensor error factor $f_i$, $f_i'$, $f_i''$, $f_i'''$ and if necessary the heat value profile $H_i$, $H_i'$ can also be given themselves directly as a function of the common variables t, T and thus can be correlated with the consumption profile $l_i$, $l_i'$, $L_i$.

In the following, embodiments for computing specifications are indicated for using the gas meter 1 as an improved volume, mass or energy measuring device. The calculation is implemented for example with support values or average values in a time interval indexed with i; instead of adding support point values, integrals of function values can also be formed over the common variable, e.g. time. There applies:

$$V_n = V_s \cdot K \tag{E1}$$

$$K = 1/\Sigma_i(l_i \cdot f_i) \tag{E2}$$

with output value $V_n$=supplied standard volume (=standard volume added up over a specific time=integral of the standard volume through-flow rate for current gas composition 3a) and measuring signal $V_s$=operating volume added up in the period of time, K=correction factor F, $l_i=V_{ni}/V_n$=gas quantity load profile relative to standard volume (standardisation e.g.: $\Sigma_i V_{n,i}=V_n$, i.e. $\Sigma_i l_i=1$), $f_i=V_{si}/V_{ni}$=sensor error factor for operating volume measuring errors, $V_{si}$=operating volume signal (indicated by gas meter 1, pressure- and temperature-dependent) and $V_{ni}$=standard volume (actually supplied) in the time interval i. There is in fact $$V_{si} = V_{ni} \cdot f_i = l_i \cdot f_i \cdot V_n \tag{E3}$$

$$V_s = \Sigma_i V_{si} = V_n \cdot \Sigma_i(l_i \cdot f_i) \tag{E4}$$

If a standard volume signal $V_{ns}$ is detected by the gas meter 1 as measuring signal (=added-up standard volume measured actually over a specific time by the gas meter 1=integral of the measured through-flow rate for current gas composition 3a) and is added up in the accounting period, then there applies $$V_n = V_{ns} \cdot K' \tag{E10}$$

$$K' = 1/\Sigma_i(l_i \cdot f_i') \tag{E20}$$

with K'=correction factor F, $f_i'=V_{nsi}/V_{ni}$=sensor error factor for standard volume measuring errors, $V_{nsi}$=standard volume signal and $V_{ni}$=standard volume in the time interval i. There is in fact $$V_{nsi} = V_{ni} \cdot f_i' = l_i \cdot f_i' \cdot V_n \tag{E30}$$

$$V_{ns} = \Sigma_i V_{nsi} = V_n \cdot \Sigma_i(l_i \cdot f_i') \tag{E40}$$

If a gas mass signal $M_s$ is detected by the gas meter 1 as measuring signal and added up in the accounting period and a corrected gas mass M is calculated as output value, then there applies $$M = M_s \cdot K'' \tag{E11}$$

$$K'' = 1/\Sigma_i(l_i' \cdot f_i'') \tag{E21}$$

with K''=correction factor F, $l_i'=M_i/M$=gas quantity load profile relative to gas mass, $f_i''=M_{si}/M_i$=sensor error factor for gas mass measuring errors, $M_{si}$=gas mass signal and $M_i$=gas mass in the time interval i. There is in fact $$M_{si} = M_i \cdot f_i'' = l_i' \cdot f_i'' \cdot M \tag{E31}$$

$$M_s = \Sigma_i M_{si} = M \cdot \Sigma_i(l_i' \cdot f_i'') \tag{E41}$$

When using the gas meter 1 as gas energy measuring device 1, several formulations are also possible, a few of which are indicated subsequently by way of example. If an operating volume signal $V_s$ is detected by the gas meter as measuring signal and added up in the accounting period and a corrected supplied gas energy E is calculated as output value, then there applies $$E = V_s \cdot H_{gew,s} \tag{E12}$$

$$H_{gew,s} = \Sigma_i(H_i \cdot l_i)/\Sigma_i(l_i \cdot f_i) \text{ or} \tag{E22a}$$

$$H_{gew,s} = 1/\Sigma_i(L_i \cdot f_i/H_i) \tag{E22b}$$

with $H_{gew,s}$=weighted specific heat value per standard volume=correction factor F, $H_i$=heat value profile per standard volume, $l_i=V_{ni}/V_n$=gas quantity load profile relative to standard volume $V_n$ or $L_i=E_i/E$=gas energy load profile relative to gas energy E, $f_i=V_{si}/V_{ni}$=sensor error factor for operating volume measuring errors, $V_{si}$=operating volume signal, $V_{ni}$=standard volume and $E_i$=gas energy in the time interval i. With (E4) there is of course on the one hand $$V_{ni} = V_n \cdot l_i = V_s \cdot l_i/\Sigma_i(l_i \cdot f_i) \tag{E32a}$$

$$E_i = H_i \cdot V_{ni} \tag{E42a}$$

$$E = \Sigma_i E_i = V_s \Sigma_i(H_i \cdot l_i)/\Sigma_i(l_i \cdot f_i) \tag{E52a}$$

and on the other hand $$E_i = E \cdot L_i = H_i V_{ni} \tag{E32b}$$

$$V_{si} = V_{ni} \cdot f_i = E \cdot L_i \cdot f_i/H_i \tag{E42b}$$

$$V_s = \Sigma_i V_{si} = E \cdot \Sigma_i(L_i \cdot f_i/H_i) \tag{E52b}$$

If a standard volume signal $V_{ns}$ is detected by the gas meter 1 as measuring signal and added up in the accounting period, then there applies $$E = V_{ns} \cdot H_{gew,ns} \tag{E13}$$

$$H_{gew,ns} = \Sigma_i(H_i \cdot l_i)/\Sigma_i(l_i \cdot f_i') \text{ or} \tag{E23a}$$

$$H_{gew,ns} = 1/\Sigma_i(L_i \cdot f_i'/H_i) \tag{E23b}$$

with $H_{gew,ns}$=weighted specific heat value per standard volume=correction factor F, $H_i$=heat value profile per standard volume, $l_i=V_{ni}/V_n$=gas quantity load profile or $L_i=E_i/E$=gas energy load profile, $f_i'=V_{nsi}/V_{ni}$=sensor error factor for standard volume measuring errors, $V_{nsi}$=standard volume signal and $V_{ni}$=standard volume in the time interval i. With (E40) there is of course on the one hand $$V_{ns} = V_n \cdot \Sigma_i(l_i \cdot f_i') \tag{E40}$$

$$V_{ni} = V_n \cdot l_i = V_{ns} \cdot l_i/\Sigma(l_i \cdot f_i') \tag{E33a}$$

$$E_i = H_i \cdot V_{ni} \tag{E43a}$$

$$E = \Sigma_i E_i = V_{ns} \Sigma_i(H_i \cdot l_i)/\Sigma_i(l_i \cdot f_i') \tag{E53a}$$

On the other hand there applies $$E_i = E \cdot L_i = H_i V_{ni} \tag{E33b}$$

$$V_{nsi} = V_{ni} \cdot f_i' = E \cdot L_i \cdot f_i'/H_i \tag{E43b}$$

$$V_{ns} = \Sigma_i V_{nsi} = E \Sigma_i(L_i \cdot f_i'/H_i) \tag{E53b}$$

If a gas mass signal $M_s$ is detected by the gas meter 1 as measuring signal and added up in the accounting period, then there applies $$E = M_s \cdot H_{gew,M} \tag{E14}$$

$$H_{gew,M} = \Sigma(H_i \cdot l_i')/\Sigma_i(l_i' \cdot f_i'') \text{ or} \tag{E24a}$$

$$H_{gew,M} = 1/\Sigma_i(L_i \cdot f_i''/H_i) \tag{E24b}$$

with $H_{gew,M}$=weighted specific heat value per mass=correction factor F, $H_i'$=heat value profile per mass, $l_i'=M_i/M$=gas mass load profile relative to gas mass M, $f_i''=M_{si}/M_i$=sensor error factor for gas mass measuring errors, $M_{si}$=gas mass signal and $M_i$=gas mass in the time interval i. With (E41) there applies of course on the one hand $$M_s=\Sigma_i M_{si}=M\cdot\Sigma_i(l_i'\cdot f_i'') \quad (E41)$$

$$M_i=M\cdot l_i'=M_s\cdot l_i'/\Sigma_i(l_i'\cdot f_i'') \quad (E34a)$$

$$E_i=H_i'\cdot M_i \quad (E44a)$$

$$E=\Sigma_i E_i=M_s\Sigma_i(H_i'\cdot l_i')/\Sigma_i(l_i'\cdot f_i'') \quad (E54a)$$

On the other hand there applies $$E_i=E\cdot L_i=H_i'\cdot M_i \quad (E34b)$$

$$M_{si}=M_i\cdot f_i''=E\cdot L_i\cdot f_i''/H_i' \quad (E44b)$$

$$M_s=\Sigma_i M_{si}=E\cdot\Sigma_i(L_i\cdot f_i''/H_i') \quad (E54b)$$

If a gas energy signal $E_s$ is detected by the gas meter 1 as measuring signal and added up in the accounting period, then there applies $$E=E_s\cdot h_{gew} \quad (E15)$$

$$h_{gew}=\Sigma_i(H_i\cdot l_i')/\Sigma_i(H_i\cdot l_i\cdot f_i''') \text{ or} \quad (E25a)$$

$$h_{gew}=1/\Sigma_i(L_i\cdot f_i''') \quad (E25b)$$

with $h_{gew}$=weighted heat value correction factor=correction factor F, $H_i=E_i/V_{ni}$=heat value profile per standard volume, $l_i=V_{ni}/V_n$=gas quantity load profile or $L_i=E_i/E$=gas energy load profile, $f_i'''=E_{si}/E_i$=sensor error factor for gas energy measuring errors, $E_{si}$=gas energy signal and $E_i$=gas energy in the time interval i. There applies in fact on the one hand $$E_i=H_i\cdot V_{ni}=V_n\cdot H_i\cdot l_i \quad (E35a)$$

$$E_{si}=E_i\cdot f_i'''=V_n\cdot H_i\cdot l_i\cdot f_i''' \quad (E45a)$$

$$E_s=\Sigma_i E_{si}=V_n\Sigma_i(H_i\cdot l_i\cdot f_i''') \quad (E55a)$$

$$E=\Sigma_i E_i=V_n\Sigma_i(H_i\cdot l_i) \quad (E65a)$$

$$E=E_s\cdot\Sigma_i(H_i\cdot l_i)/\Sigma_i(H_i\cdot l_i\cdot f_i''') \quad (E66a)$$

On the other hand, there applies $$E_i=E\cdot L_i \quad (E35b)$$

$$E_{si}=E_i\cdot f_i'''=E\cdot L_i\cdot f_i''' \quad (E45b)$$

$$E_s=\Sigma_i E_{si}=E\Sigma_i(L_i\cdot f_i''') \quad (E55b)$$

For energy accounting, the gas energy E should be multiplied by the price per energy unit. This price can if necessary also be time-dependent, which in the case of the heat value weighting, in particular in the heat value correction factor $h_{gew}$, can also be taken into account.

In the above-mentioned examples, the sensor error factor $f_i$, $f_i'$, $f_i''$, $f_i'''$ is chosen without dimension. Further embodiments for determining correction factors F can be obtained as a result of the fact that other combinations of measuring signal and output value are chosen and the auxiliary values sensor error factor, consumption profile and if necessary heat value profile are suitably defined in order to combine together measuring signal and output value or their temporally averaged values. By way of example, dimension-associated sensor error factors can be introduced, e.g. $f_i^v=V_{si}/M_i$, in order, with a given dimensionless sensor error factor, to convert load profile, heat value profile and/or measuring signal, instead of to an output value, e.g. standard volume, to a different output value, e.g. gas mass. In addition, a conversion could be performed of an energy signal $E_s$ to a standard volume or to a gas mass M. Such and similar embodiments may herewith be disclosed jointly in an explicit manner.

The through-flow sensor 1a is preferably a thermal through-flow sensor 1a, with which a sensor signal $S_{kal}$ calibrated to a through-flow rate is determined. In order to calibrate the gas meter 1 as energy measuring device 1, the calibrated sensor signal $S_{kal}$ is calibrated using a basic heat value factor $H_{CH}$ for a basic gas mixture CH into the gas energy signal $E_s$.

According to WO 01/96819 A1, there is effected in the thermal through-flow sensor 1a, in particular in the CMOS anemometer through-flow sensor 1a, an inherent automatic heat value tracking in the case of deviations of the current gas mixture 3b from the basic gas mixture CH. Since the inherent heat value tracking is incomplete, now, starting from the first energy calibration for the basic gas mixture CH, a second improved energy calibration is implemented according to the invention by means of the weighted heat value correction factor $F=h_{gew}$.

For the mentioned gas energy measuring device 1 with thermal through-flow sensor 1a, the underlying measuring method is now described in more detail. According to WO 01/96819 A1, a sensor signal $S_{N2}$ (previously S) for a calibration gas, typically nitrogen $N_2$ or air, is determined and calibrated to an (uncorrected) mass flow signal $S_m$ (previously $S(d(V_{N2,n})/dt)$, $d(V_{N2,n})/dt$=standard volume flow for calibration gas). The calibration can be expressed by a sensor calibration curve $F(S_{N2})$ for the calibration gas under normal conditions, $S_m$ being proportional to $F(S_{N2})$ or simply $S_m=F(S_{N2})$. The mass flow signal $S_m$ still depends upon the type of gas. Hence, deviations of the mass flow signal $S_m$ from an exact ideal value for a basic gas mixture, typically natural gas or in general a hydrogen mixture CH, are corrected by a signal conversion factor or sensor signal correction factor $f_{N2-CH}$. Hence there applies $S_M=S_m\cdot f_{N2-CH}$ with $S_M$=corrected mass flow signal. In the sense of this disclosure, $S_M$ is equal to or proportional to the previously mentioned calibrated sensor signal $S_{kal}$ of the through-flow sensor 1a. Likewise, the gas standard volumes $V_{ns,i}$ and $V_{ns}$ in the case of sufficiently constant gas quality, are equal to or proportional to the calibrated sensor signals $S_{kal}$ or average values of $S_{kal}$ in the associated time interval i. The calibrated sensor signal $S_{kal}$ is therefore a measure of and in particular proportional to a through-flow rate of the gas composition 3b to be measured. Therefore $S_{kal}=S_m\cdot f_{N2-CH}$ can be written, a possibly necessary proportionality factor being taken into account in the sensor calibration curve $F(S_{N2})$. Finally, an energy signal $E_s$ is determined by multiplication of the calibrated sensor signal $S_{kal}$ by a heat value $H_{CH}$ (calorimetric value per unit of the through-flow value, i.e. per standard volume or per mass) of the basic gas mixture: $E_s=\int S_{kal}\cdot H_{CH}\cdot dt=f_{N2-CH}\cdot H_{CH}\int F(S_{N2})\cdot dt$ or $E_s=\overline{S_{kal}}\cdot H_{CH}$ with $\overline{S_{kal}}$=averaged calibrated sensor signal.

According to WO 01/96819 A1 or EP 1 227 305, introduced herewith in their entirety by reference, also suitable time average values can be used for the mentioned values $S_{N2}$, $F(S_{N2})$, $f_{N2-CH}$ and $H_{CH}$ and values derivable therefrom.

FIG. 4 shows how heat value variations up to a fraction are detected inherently from the sensor signals $S_{kal}$ of the through-flow sensor 1a. This characteristic is known per se from WO 01/96819 A1 and can be stored quantitatively in the gas meter 1 for example as sensor error factor $f_i'''=E_{si}/E_i$. The sensor error factor $f_i'''$ is therefore chosen to be proportional to the deviations between the inherently detected and the actual heat value variations of the gas composition 3b at the gas supply location 14 or as an average of these deviations. These deviations, i.e. the inherent heat value dependency of the energy signals $E_s$ relative to a basic gas mixture CH, are corrected in that the sensor error factor $f_i'''$ in the correction factor F according to the invention is taken into account and the energy signals $E_s$ are calibrated by means of the correction factor F subsequently and/or offline to improved or corrected or actual gas energy output values E.

The invention also has a gas meter 1 for implementing the above-described method as subject. According to FIG. 1 and 2, the gas meter 1 is disposed at a gas supply location 14 of a gas supply network 11 and has a through-flow sensor 1a and a measuring and evaluating unit 7 for determining a measuring signal $V_s$, $V_{ns}$, $M_s$, $E_s$ for a quantity and/or energy consumption of the gas 3a, the measuring and evaluating unit 7 having computing means 7a for determining and/or storing a sensor error factor $f_i$, $f_i'$, $f_i''$, $f_i'''$ of the gas meter 1 and a consumption profile $l_i$, $l_i'$, $L_i$ characteristic of the gas supply location 14 and also for calculating a correction factor F by weighted averaging of the sensor error factor $f_i$, $f_i'$, $f_i''$, $f_i'''$ with the consumption profile $l_i$, $l_i'$, $L_i$, and the measuring and evaluating unit 7 has furthermore computing means 7b for converting the measuring signal $V_s$, $V_{ns}$, $M_s$, $E_s$ by means of the correction factor F into an output value $V_n$, M, E of the gas meter 1. Preferably, the measuring and evaluating unit 7 comprises a data memory 7d for storing the sensor error factor $f_i$, $f_i'$, $f_i''$, $f_i'''$ and the consumption profile $l_i$, $l_i'$, $L_i$ as a function of a common time variable and/or temperature variable T.

Advantageously, the through-flow sensor 1a is a thermal through-flow sensor 1a, in particular a CMOS anemometer 1a, with a heating wire 6 and temperature sensors 5a, 5b disposed upstream and downstream. The measuring and evaluating unit 7 has in particular means for calibration of the gas supply in energy units kW/h.

Furthermore, the measuring and evaluating unit 7 can comprise computing means 7c for determining a calibrated sensor signal $S_{kal}$ by means of re-evaluation of a calibration gas to a basic gas mixture CH and for determining a gas energy signal $E_s$ by means of multiplication of the calibrated sensor signal $S_{kal}$ by a basic heat value factor $H_{CH}$. In particular, computing means 7a for determining and/or storing a sensor error factor $f_i'''$ for gas energy measurement is present for detection and correction of an inherent dependency of the calibrated sensor signal $S_{kal}$ of the through-flow sensor 1a upon heat value variations. The computing unit 7a, 7b, 7c and/or the data memory 7d can also be disposed outwith the gas meter 1.

| Reference number list | |
|---|---|
| 1 | Gas meter |
| 1a | Thermal mass flow sensor, CMOS sensor |
| 1b | Membrane |
| 2 | Flow channel, pipe |
| 3a | Gas composition in the gas network; natural gas |
| 3b | Gas composition at the supply location; natural gas |
| 4 | Flow profile |
| 5a,5b | First, second temperature sensor, thermoelements |
| 6 | Heating element, heating wire |
| 7 | Measuring and evaluating unit |
| 7a,7b,7c | Computing means |
| 7d | Data memory |
| 8 | Signal output, display |

-continued

| Reference number list | |
|---|---|
| 9 | Receiving unit, transmitting unit (optional) |
| 10 | External unit, operator, central office |
| 11 | Gas supply network |
| 12 | Gas supply |
| 13 | Consumer |
| 14 | Gas supply location |
| 15 | Through-flow measurement, measuring point of the operator |
| CH | Natural gas, basic gas mixture |
| $F(S_{N2})$ | Sensor calibration curve |
| $f_{N2\text{-}CH}$ | Signal conversion factor |
| $f_i, f_i', f_i'', f_i'''$ | Sensor error factor |
| F | Correction factor |
| $H_{CH}$ | Basic heat value factor for the basic gas mixture |
| $H_i, H_i'$ | Heat value, heat value profile of the gas composition |
| $H_{gew,s}, H_{gew,ns}$ | Weighted heat value per standard volume |
| $H_{gew,M}$ | Weighted heat value per gas mass |
| $h_{gew}$ | Weighted heat value correction factor |
| K,K',K'' | Volume correction factor, mass correction factor |
| $l_i, l_i', L_i''$ | Gas consumption profile, load profile |
| S | Sensor signal |
| $S_m$ | Uncorrected mass flow or sensor signal |
| $S_M$ | Corrected mass flow signal for the basis gas mixture |
| $S_{N2}$ | Calibration gas sensor signal |
| $S_{kal}$ | Calibrated sensor signal |
| t | Time variable |
| $T, T_1, T_2$ | Temperatures |
| v | Flow velocity |
| $V_s, V_{ns}, M_s, E_s$ | Measuring signal |
| $V_n, M, E$ | Output value |
| i | Index for time interval |
| s | Index for measuring signal |

The invention claimed is:

1. A method for measuring a gas supply using a gas meter which is situated at a gas supply location of a gas supply network, comprising:
    determining a measuring signal for at least one of a quantity consumption and an energy consumption of the gas using a flow sensor of the gas meter;
    determining a sensor error factor and a consumption profile for an accounting period as a function of a common variable, the consumption profile for the gas consumption being a profile characteristic of the gas supply location, the sensor error factor of the gas meter being indicative of a deviation between a consumption measured by the gas meter and an actual consumption;
    determining a consumption-weighted correction factor relative to an accounting period by averaging the sensor error factor weighted with the consumption profile, wherein at least one of the averaging includes at least one of summation and integration overt he common variable of products which contain the sensor error factor and the consumption profile, the averaging is implemented using a heat value profile relative to the common variable, and the averaging includes a suitable standardization function; and
    determining an output value as a function of the correction factor and the measuring signal.

2. The method of claim 1, wherein the gas supply is measured in at least one of a private sector, a public sector and an industrial sector.

3. The method according to claim 1, wherein at least one of
    the measuring signal is one of an operating volume signal, a standard volume signal, a gas mass signal and an energy signal measured by the gas meter;

the output value is one of a supplied standard volume, a supplied gas mass and a supplied gas energy; and the output value is determined by multiplication of the measuring signal by the correction factor.

4. The method according to claim 1, wherein one of the measuring signal, in a non-registering operation, is added up by the gas meter over a long accounting period and, subsequently, converted into the output value one of (i) outside the gas meter and (ii) in the gas meter; and the measuring signal, in a registering operation, is currently determined by the gas meter, and is added up over a short accounting period, and is converted into the output value using the currently determined correction factor one of (i) in the gas meter and (ii) outside the gas meter.

5. The method according to claim 1, wherein the sensor error factor is determined as a function of a gas composition.

6. The method according to claim 5, wherein the gas composition is determined as a function of the common variable.

7. The method according to claim 1, further comprising determining one of a heat value and a heat value profile, wherein one of the heat value and the heat value profile is determined as a function of a gas composition.

8. The method according to claim 1, wherein at least one of the sensor error, a heat value and a heat value profile is determined as a function of a gas composition using calibration tables.

9. The method according to claim 1, wherein at least one of one of a supplied gas composition and a gas composition present at the gas supply location is determined by an operator of the gas supply network; and the gas composition at the gas supply location is calculated at least approximately from a supplied gas quality using simulation calculation for gas flows in the gas supply network.

10. The method according to claim 9, wherein one of the supplied gas composition and the gas composition is determined by the operator of the gas supply network from one of empirical values, measuring values, prognosis values and values of the gas quality derived therefrom.

11. The method according to claim 1, wherein the common variable is one of a time variable and a temperature.

12. The method according to claim 11, wherein the time variable is a time of one of a day, a weekday, a month and a course of a year.

13. The method according to claim 11, wherein the temperature is one of an outside temperature profile and a temperature average value at the gas supply location relative to the accounting period.

14. The method according to claim 1, wherein at least one of the consumption profile is one of (i) a gas quantity load profile relative to a standard volume, (ii) a gas mass load profile relative to a gas mass and (iii) a gas energy load profile relative to a gas energy; and the consumption profile is indicated by one of an approximation formula and support values.

15. The method according to claim 1, wherein at least one of the consumption profile is determined one of (i) globally for a section of the gas supply network comprising the gas supply location and (ii) locally for the gas supply location; and the consumption profile is produced from one of empirical values, measuring values, prognosis values and values of the gas consumption at the gas supply location derived therefrom.

16. The method according to claim 1, wherein one of the output value is $V_n = V_s \cdot K$, wherein $V_n$ is a supplied standard volume and $V_s$ is an operating volume signal added up in the accounting period, $K = 1/\Sigma_i(l_i \cdot f_i)$ is the correction factor F, $l_i = V_{ni}/V_n$ is a gas quantity load profile relative to standard volume, $f_i = V_{si}/V_{ni}$ is a sensor error factor for operating volume measuring errors, $V_{si}$ is an operating volume signal and $V_{ni}$ is a standard volume in a time interval I;

the output value is $V_n = V_{ns} \cdot K'$, wherein $V_n$ is the supplied standard volume and $V_{ns}$ is a standard volume signal added up in the accounting period, $K' = 1/\Sigma_i(l_i \cdot f_i')$ is the correction factor F, $l_i = V_{ni}/V_n$ is the gas quantity load profile relative to standard volume, $f_i' = V_{nsi}/V_{ni}$ is the sensor error factor for standard volume measuring errors, $V_{nsi}$ is a standard volume signal and $V_{ni}$ is the standard volume in the time interval I; and the output value $M = K_s \cdot K''$, wherein M is a supplied gas mass and $M_s$ is a gas mass signal added up in the accounting period, $K'' = 1/\Sigma_i(l_i \cdot f_i'')$ is the correction factor, $l_i = M_i/M$ is a gas quantity load profile relative to gas mass, $f_i'' = M_{si}/M_i$ is a sensor error factor for gas mass measuring errors, $M_{si}$ is a gas mass signal and $M_i$ is a gas mass in the time interval i.

17. The method according to claim 1, wherein one of the output value is one of (i) $E = V_s \cdot H_{gew,s}$ and (ii) $E = V_n \cdot H_{gew,ns}$, wherein $E_i$ is a supplied gas energy, $V_s$ is an operating volume signal added up and $V_{ns}$ is a standard volume signal added up in the accounting period, wherein the correction factor F is a weighted specific heat value per standard volume one of (i) $H_{gew,s} = \Sigma_i(H_i \cdot l_i)/\Sigma_i(l_i \cdot f_i)$, $H_{gew,s} = 1/\Sigma_i(L_i \cdot f_i/H_i)$, (ii) $H_{gew,ns} = \Sigma_i(H_i \cdot l_i)/\Sigma_i(l_i \cdot f_i')$ and (iii) $H_{gew,ns} = 1/\Sigma_i(L_i \cdot f_i'/H_i)$ wherein $H_i$ is a heat value profile per standard volume, (i) $l_i = V_{ni}/V_n$ is a gas quantity load profile relative to standard volume $V_n$, $L_i = E_i/E$ is a gas energy load profile relative to gas energy E, $f_i = V_{si}/V_{ni}$ is a sensor error factor for operating volume measuring errors, $f_i' = V_{nsi}/V_{ni}$ is a sensor error factor for standard volume measuring errors, $V_{si}$ is an operating volume signal, $V_{nsi}$ is a standard volume signal, $V_{ni}$ is a standard volume and $E_i$ is a gas energy in the time interval I; and the output value is $E = M_s \cdot H_{gew,M}$, wherein E is a supplied gas energy and $M_s$ is a gas mass signal added up in the accounting period, wherein the correction factor F is a weighted specific heat value per mass one of (i) $H_{gew,M} = \Sigma_i(H_i' \cdot l_i')/\Sigma_i(l_i' \cdot f_i'')$ and (ii) $H_{gew,M} = 1/\Sigma_i(L_i \cdot f_i''/H_i')$ wherein $H_i'$ is a heat value profile per mass, $l_i' = M_i/M$ is a gas mass load profile relative to gas mass M, $f_i''' = M_{si}/M_i$ is a sensor error factor for gas mass measuring errors, $M_{si}$ is a gas mass signal and $M_i$ is a gas mass in the time interval i.

18. The method according to claim 1, wherein the output value $E = E_s \cdot h_{gew}$, wherein E is a supplied gas energy and $E_s$ is a gas energy signal added up in the accounting period, wherein the correction factor F is a weighted heat value correction factor one of (i) $h_{gew} = \Sigma_i(H_i \cdot l_i)/\Sigma_i(H_i \cdot l_i \cdot f_i''')$ and (ii) $h_{gew} = 1/\Sigma_i(L_i \cdot f_i''')$ wherein $H_i$ is a heat value profile per standard volume, $l_i = V_{ni}/V_n$ is a gas quantity load profile relative to standard volume $V_n$, $L_i = E_i/E$ is a gas energy load profile relative to gas energy E, $f_i''' = E_{si}/E$ is a sensor error factor for gas energy measuring errors, $E_{si}$ is a gas energy signal and $E_i$ is a gas energy in the time interval i.

19. The method according to claim 18, wherein the flow sensor is a thermal flow sensor, the method further comprising:
  determining, using the thermal flow sensor, a sensor signal calibrated to a flow rate; and
  calibrating the calibrated sensor signal into the gas energy signal using a basic heat value factor for a basic gas mixture in order to calibrate the gas meter as an energy measuring device.

20. The method according to claim 19, wherein the calibration step further includes the following substeps:
  determining and storing calibration gas sensor signals for the flow rate of a calibration gas as a sensor calibration curve in the gas meter;
  determining the calibrated sensor signal by multiplication of the sensor calibration curve by a signal conversion factor; and
  determining the gas energy signal $E_s$ from the calibrated sensor signal by multiplication by the basic heat value factor.

21. The method according to claim 19, further comprising:
  inherently detecting, front the calibrated sensor signal of the flow sensor, heat value deviations up to a fraction;
  determining deviations between the inherently detected and the actual heat value variations of the gas composition at the gas supply location using the sensor error factor for gas energy measuring errors; and
  correcting the deviations during the conversion of the gas energy signal into the gas energy.

22. A gas meter for measuring a gas supply according to claim 1.

23. A gas meter for measuring a gas supply, comprising:
  a flow sensor; and
  a measuring and evaluating unit (MEU) determining a measuring signal for at least one of a quantity consumption and an energy consumption of the gas,
  wherein the MEU includes first and second computing arrangements, the first computing arrangement determining and at least one of (i) storing a sensor error factor of the gas meter and (ii) a consumption profile characteristic of the gas supply location, the first computing arrangement calculating a correction factor by weighted averaging of the sensor error factor with the consumption profile,
  wherein the first comnutina arrangement detects and corrects an inherent dependency of calibrated sensor signal of the flow sensor upon heat value variations using the stored sensor error factors for gas energy measurements, and
  wherein the second computing arrangement converts the measuring signal using the correction factor into an output value of the gas meter.

24. The gas meter according to claim 23, wherein the gas supply is measured in at least one of a private sector, a public sector and an industrial sector.

25. The gas meter according to claim 23, wherein the MEU includes a data memory arrangement storing the sensor error factor and the consumption profile as a function of at least one of a common time variable and a temperature variable.

26. The gas meter according to claim 25, wherein at least one of the first computing arrangement, the second computing arrangement and the data memory arrangement is situated one of (i) outside the gas meter and (ii) in the gas meter.

27. The gas meter according to claim 23, wherein at least one of
  the flow sensor includes a thermal through-flow sensor with a heating wire and temperature sensors disposed upstream and downstream of the heating wire; and
  the MEU includes a calibrating arrangement calibrating the gas supply in energy units.

28. The gas meter according to claim 27, wherein the thermal through-flow sensor is a CMOS anemometer.

29. The gas meter according to claim 23, wherein the MEU includes a third computing arrangement determining (i) a calibrated sensor signal using re-evaluation of a calibration gas to a basic gas mixture and (ii) a gas energy signal using multiplication of the calibrated sensor signal by a basic heat value factor.

* * * * *